Feb. 18, 1941.   H. H. CARY   2,232,212
APPARATUS FOR AMPLIFYING DIRECT CURRENT VOLTAGES AND CURRENTS
Filed Jan. 17, 1940
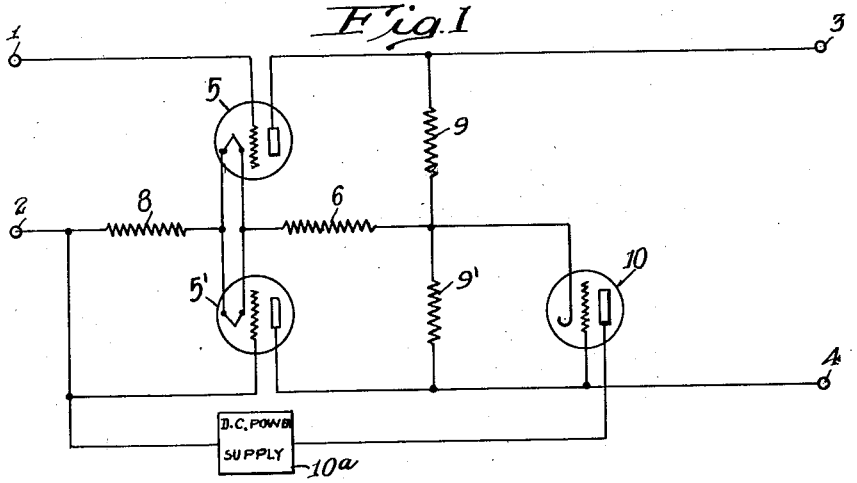
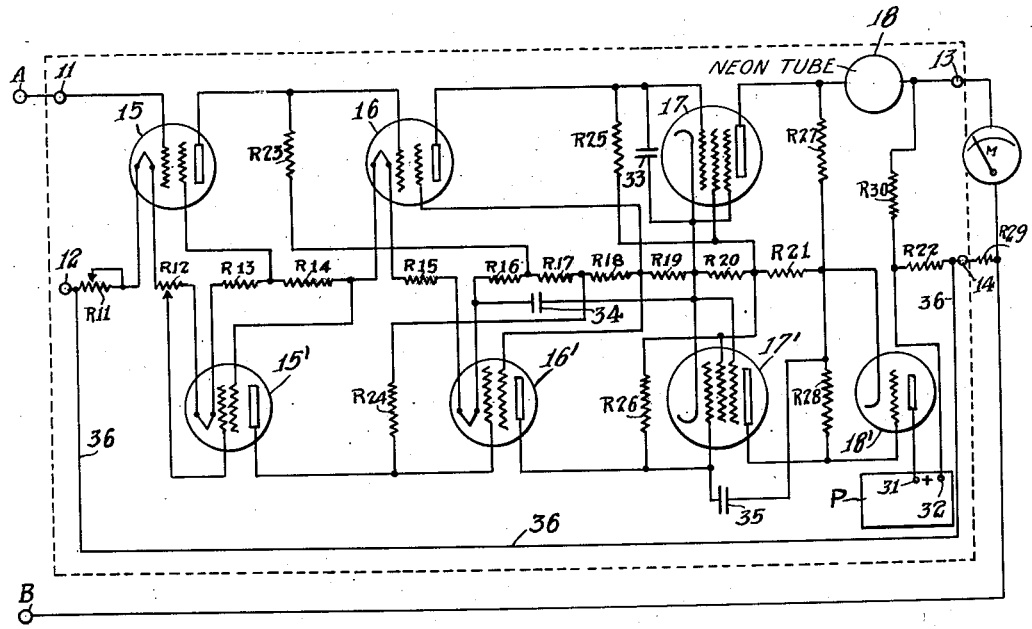
Inventor
Henry H. Cary
By Lyon Lyon
Attorneys Patented Feb. 18, 1941

2,232,212

UNITED STATES PATENT OFFICE 2,232,212

APPARATUS FOR AMPLIFYING DIRECT CURRENT VOLTAGES AND CURRENTS

Henry H. Cary, Santa Monica, Calif., assignor to National Technical Laboratories, Pasadena, Calif., a corporation of California Application January 17, 1940, Serial No. 314,275

16 Claims. (Cl. 179—171)

This invention relates to an apparatus for amplifying D. C. voltages and currents, particularly for the purpose of measuring such voltages and currents, and, while not limited thereto, has particular application to the amplification of the small voltages encountered in glass electrode pH measurement.

It is the major object of the present invention to provide an apparatus for the amplification of D. C. voltages or currents which may employ a source of power either of A. C. or D. C. character, which apparatus is so designed as to prevent fluctuations in the voltage of such source of power effecting the amplifier output.

A further object of the present invention is to provide an amplifier for D. C. voltages and currents employing a plurality of amplifier tubes in cascade and arranged to operate from a common source of power, and so designed as to greatly reduce feed-back effects.

A further object of the present invention is to provide a D. C. amplifier powered with A. C. current, such as ordinary mains, and of such stability that frequent adjustments are not required even though variations may take place in the voltage of the A. C. source.

A D. C. amplifier is a very useful device having many applications to the measurement and control of steady or slowly fluctuating electrical quantities. In such applications it is essential that the amplifier be adjusted to deliver a predetermined output current for a given input voltage, and it is desirable that the amplifier maintain this adjustment for a sufficiently long period of time to permit the measurement or control function to be carried out. In a sensitive amplifier it is frequently difficult to maintain this adjustment long enough to permit accurate operation of the apparatus for a period greater than a few minutes. This difficulty arises mainly from the following causes:

First, the voltages of the source of power, such as batteries or A. C. mains supplied to the D. C. amplifier, may fluctuate over a period of time, causing fluctuations in the amplifier output circuit.

Second, the characteristics of the amplifier tubes and other circuit elements may vary with time due to the aging effects, producing variations in the amplifier output current.

Third, the characteristics of the amplifier tubes and other circuit elements may vary with changing atmospheric temperature, producing variations in the amplifier output current.

As a result of these factors, there may be a gradual drift in the output current of the amplifier that is entirely unrelated to the voltage applied to the input, and if uncorrected will lead to erroneous results in measurement and control.

Various attempts have been made towards reducing this amplifier drift. In general, the problem is attacked by employing power supplies designed to maintain as nearly as possible a constant voltage and by using various compensating circuits by which the effects of small variations in supply voltage and tube characteristics are sought to be balanced out. In one type of such compensating circuit identical vacuum tubes are employed in a balanced bridge circuit and supplied power from a common source. By arranging the amplifier tubes in a bridge circuit it is possible to cancel out any variations in the action of the amplifier due to changes in supply voltages, tube characteristics, etc., as long as the two tubes retain identical characteristics. The input signal is applied to one of such tubes and the output is obtained from the combined tubes, and, therefore, in theory the output of the amplifier will be independent of fluctuations in power supply voltages, etc., and will depend only upon the applied input voltage.

In practice, it is very difficult, however, to find two tubes with identical characteristics. By adding several adjustable resistors to the circuit it is possible to eliminate the requirement of identical tubes, and, by careful adjustment, good stability may be had over a narrow range of power supply voltages. However, the process of adjusting such a circuit is rather difficult, even for an expert; and, for commercial use where inexperienced operators may be called upon to make tube replacements, such schemes for balancing tube characteristics are usually impractical.

In accordance with the present invention, these difficulties are overcome by modifying the bridge circuit, so that, while the first tube amplifies the input voltage in the usual manner, the second or compensating tube is made to regulate the operating voltage supplied to the elements of both tubes in such a way that the voltage applied to the tubes tends to remain constant. Thus, drifts in the plate potentials of both tubes are reduced and less circuit balance is required to limit the output drift to a given value. With the apparatus of the present invention, I, therefore, eliminate drift of the amplifier without imposing upon the circuit the necessity that the tubes be exactly identical in characteristics and without the necessity of employing compensating resistors or careful adjustment of the amplifier.

The amplifier of the present invention, together with various further objects and advantages of the invention will best be understood from a description of the preferred form or forms of amplifier embodied in the present invention. For this purpose, I have hereinafter described the invention in connection with the accompanying drawing, in which—

Figure 1 is a diagrammatic view of one form of the amplifier embodying the present invention.

Figure 2 is a diagrammatic view of a second form of amplifier embodying the present invention and illustrating particularly the use of the invention in a cascade amplifying system.

Referring to the drawing, in Figure 1 there is shown a D. C. amplifying apparatus employing thermionic vacuum tubes 5 and 5', which are preferably of similar characteristics, although through the use of the present invention it is not demanded that such tubes be of exactly identical characteristics. The tubes 5 and 5' have their corresponding elements (cathode or filament, grid, and plate) supplied with power from a common source which, as illustrated, comprises voltage drop existing in the apparatus across the resistors 6 and 8 and filaments of tubes 5 and 5'. In this manner, the elements of each tube are similarly affected by any variation in the source of power or voltage connected thereto. The tube 5 acts as the amplifier of the D. C. voltage to be measured. For this purpose, the D. C. voltage to be amplified is applied to terminals 1 and 2, connected respectively to the grid of tube 5 and to the cathode of tube 5 through resistor 8. The output of tubes 5 and 5' is connected by equal plate resistors 9 and 9' to the source of plate potential, i. e., the resistor 6 and the output of the combined amplifying apparatus is taken from the plates of tubes 5 and 5' at the terminals 3 and 4. The voltage source for the elements of tubes 5 and 5', i. e., resistors 6 and 8, derives power from a D. C. power supply 10ª. While various suitable sources of D. C. power supply for the amplifying apparatus may be employed, such, for example, as batteries, the D. C. power supply 10ª is generally preferred to be the rectified and filtered output of a power supply connected to any usual or preferred A. C. mains. This power supply 10ª is connected to cause the current to flow from plate to cathode of a regulating tube 10, and thence through resistor 6, filaments of tubes 5 and 5', and resistor 8 to the power supply 10ª. This flow of current from the power supply 10ª, in turn, provides the necessary voltage drop in resistors 6 and 8, which forms a source of potential for the plate and grids of tubes 5 and 5'.

The grid of tube 10 is connected to the output of tube 5', for example, directly to the output terminal 4 whereby the bias potential for tube 10 is the voltage drop across the plate resistor 9'. which voltage drop is in turn determined by the output current of tube 5'. The function of tube 10 is to regulate the current from the power supply 10ª in accordance with variations in the plate potential of tube 5'. In circuits of the type illustrated it is almost universally the case that a proportional increase in the filament current and the voltages of sources 6 and 8 will cause an increase in the plate current of tubes 5 and 5'. Accordingly, it will be seen that in the amplifying apparatus of the present invention, if the voltage of the D. C. source of supply 10ª should increase tending to increase the current supply through resistors 6 and 8 and the filaments of tubes 5 and 5', this will act to increase the current output of tubes 5 and 5'. The voltage drop across resistor 9' will thereby increase, causing the grid of tube 10 to become more negative. This, in turn, will reduce the current flowing through tube 10 and thereby will tend to counteract the increase in current through resistors 6 and 8 and the tube filaments caused by the assumed increase in voltage of the D. C. supply 10ª.

It is, therefore, seen that in the amplifying apparatus of the present invention the tube 5' acts in conjunction with tube 10 as a means to reduce the effect of voltage variations of the D. C. source 10ª on the potentials actually applied to the elements of tubes 5 and 5'. With the effect of the power supply fluctuations reduced, less precise balance between tubes 5 and 5' is needed in order to keep the drifts below a predetermined value.

These qualitative considerations may be expressed quantitatively as follows: Suppose that the power supply voltage $E_s$ increases by a small fraction $p_s$, causing the current I through resistors 6 and 8 and the filaments to increase by a fraction $p_1$. This change in I will cause a change in the potential of the grid of tube 10 with respect to its cathode by an amount $-ap_1$ where $a$ is a constant depending on the tube type, and resistors 6, 8 and 9'. The change in current $dI$ passing through tube 10 caused by a change in its grid and plate voltage is given by the usual expression:

$$dI = \frac{u dE_g + dE_p}{r} \quad \text{(Eq. 1)}$$

where $u$ is the amplification factor of the tube, $r$ is the plate resistance, and $dE_g$ and $dE_p$ are the changes in grid and plate voltage producing the change in current $dI$. It is apparent from the circuit that if the voltage between terminal 2 and the cathode of tube 10 is represented by $E_1$, $$dE_p = E_s p_s - E_1 p_1 \quad \text{(Eq. 2)}$$

$$dE_g = -ap_1 \quad \text{(Eq. 3)}$$

$$dI = I p_1 \quad \text{(Eq. 4)}$$

so that:

$$I p_1 = \frac{-u a p_1 + E_s p_s - E_1 p_1}{r} \quad \text{(Eq. 5)}$$

Solving for $p_1$ gives:

$$p_1 = \frac{p_s E_s}{Ir + ua + E_1} \quad \text{(Eq. 6)}$$

From this, it is apparent that the percentage change in the operating voltage applied to the elements of the tubes will be smaller than the percentage change in the power supply output voltage if $E_s$ is smaller than $(Ir + ua + E_1)$. This usually can be brought about by proper selection of circuit constants. For example, in a voltage amplifier designed for a voltage gain of 50 between input terminals 1 and 2 and output terminals 3 and 4, type 32E tubes (tetrode connected) may be used for 5 and 5' with screen voltage of about 45 volts derived from a tap on resistor 6 and plate resistors 9 and 9' of one megohm each. These tubes are operated with a filament current of 35 milliamperes each, making the total current in resistors 6 and 8 approximately 70 milliamperes. Resistors 6 and 8 are proportioned to make the voltage drop E₁ between terminal 2 and the cathode of tube 10 about 75 volts. A type 6B5 tube may be used for tube 10. A suitable value for the power supply voltage $E_s$ is about 250 volts. Under these conditions, the constants in Equation 6 are approximately as follows:

$$\begin{array}{ll} E_s & 250 \\ E_1 & 75 \\ a & 150 \\ I & .070 \\ r & 15{,}000 \\ u & 40 \end{array}$$

From this it may be calculated by Equation 6, $$P_1 = .035 P_2$$

Thus, this circuit reduces the effect of power supply fluctuations to approximately 1/30 of the value that would be obtained in the conventional balanced tube circuit.

In multistage or cascade amplifiers where very high amplification is desired, the present invention may be employed to produce an amplifier having great stability in the presence of power supply fluctuations. Such an amplifier is valuable for many purposes, such, for example, as for the measurement of the voltages of glass electrode cells in the determination of pH. The present invention may also be embodied in amplifiers of the type described and claimed in my copending application, Serial No. 244,210, filed December 6, 1938, wherein the input and output terminals of the amplifier are made to include a common resistance so as to secure linear amplification of the D. C. potential of a glass electrode cell or other source of D. C. voltage to be measured. For the accurate measurement of pH it was desired to provide an amplifier having an overall mutual conductance of at least 2 mhos operated from an A. C. power supply. For satisfactory operation it was desirable that power supply voltage fluctuations of plus or minus 10% produce no more effect on the output of the amplifier than a change in input voltage of plus or minus 0.2 millivolt, and that this be achieved without any balancing adjustments. The apparatus of Figure 2 illustrates such an amplifier. In Figure 2 the amplifier section proper is enclosed within the dotted lines. In this apparatus the terminals 11 and 12 are the input terminals of the amplifier section and the terminals 13 and 14 the output terminals. These amplifier input and output terminals are connected in a potentiometer circuit including meter M, resistor 29, and terminals A and B as set forth in my copending application mentioned above. The terminals A and B are the terminals for connection to the source of voltage to be measured, and the circuit is arranged so that the input to the amplifying terminals 11 and 12 includes both the voltage to be measured (applied across the terminals A and B) and the Ir drop in resistance R29, which Ir drop is arranged to be opposed to the voltage across terminals A and B. At the same time, the meter M which indicates the amplified voltage, is connected to the output terminals 13 and 14 so as to likewise include the resistor R29. This connection between the terminals of the amplifier meter and voltage to be measured permits the meter M to respond linearly with changes in the D. C. voltage to be measured and applied across terminals A and B, and effects further advantages set forth in my said copending application.

In the amplifier of the present invention the tubes 15, 16 and 17 perform the amplifying action between the input terminals 11 and 12 and the output terminals 13 and 14, and are supplied with operating voltages tapped from suitable points along the voltage divider, including resistors R11 to R21, inclusive, which may be considered, therefore, the source of potential for the elements of tubes 15, 16 and 17. The current flowing through this voltage divider is drawn from terminal 31 of a power supply P, passing from plate to cathode of tube 18' through the voltage divider resistors from R21 to R11 through lead 36 to R22, and returning to power supply P through terminal 32. The power supply P is again any desired source of D. C. power, but is preferably the rectified and filtered output of a rectifier and filter connected to the usual A. C. mains. Changes in the plate voltage of tube 15' are amplified by tubes 16' and 17' and act on the grid of tube 18' to control the flow of current from power supply P. The operating voltages for the elements of tubes 15', 16' and 17' are obtained from taps on the voltage divider, including resistances R11 to R21.

In Figure 2 it is to be noted that the filaments of tubes 15 and 15' are not in parallel but essentially in series. This change was made over the circuit of Figure 1 in order to reduce the amount of power lost in the voltage divider. This alteration in filament connections does not affect the operation of the principle set forth previously, since the taps on the voltage divider in Figure 2 are so placed that the potential differences applied to the various elements in both tubes are the same and the relation between tubes 15 and 15' is the same in Figure 2 as the relation between tubes 5 and 5' in Figure 1—except that the voltage divider taps to tube 15' in Figure 2 have been shifted along the voltage divider by a constant amount. Tubes 15', 16' and 17' are preferably, respectively, similar in characteristics to tubes 15, 16 and 17, although through the use of the principles of the present invention exact similarities between such tubes are not essential.

The amplifier of Figure 2 is designed to effect a greater amplification of the D. C. voltage to be measured than is required for the operation of the meter M. Such a high amplification is included in the apparatus in order to secure a sufficiently high mutual conductance of the amplifier for the proper operation of the self-balancing electronic potentiometer circuit included with the amplifier, the principles of which are more particularly described in my copending application. For the potentiometer circuit the outputs between terminals 13 and 14 should be small, never exceeding one volt, whereas satisfactory operation for tube 17 calls for a potential difference between its plate and cathode of at least 50 volts. The output of the amplifier of Figure 2, therefore, differs from Figure 1 in that there is included in the output from the plate of tube 17 means to introduce a constant potential difference of approximately 100 volts between the plate of tube 17 and terminal 13. A biasing battery could be employed for this purpose, but I prefer to employ a 110 volt neon tube 18. This tube has the property of maintaining a nearly constant voltage of approximately 110 volts between its terminals, regardless of the amount of current flowing through it, so long as some current flow takes place. Resistor 30 in conjunction with the voltage drop in resistor 22 assures that a current flow will occur in the proper direction through tube 18, even under conditions when no current is flowing in meter M. The following is a summary of suitable circuit elements for use in Figure 2:

Tubes:

| | |
|---|---|
| 15, 15', 16, 16' | Type 32E |
| 17, 17' | Type 57 |
| 18' | Type 2A3 |
| 18 | 110 volt ½ watt neon tube |

Resistors:

| | | |
|---|---|---|
| R11 | ohms | 40 |
| R12 | do | 50 |
| R13 | do | 410 |
| R14 | do | 75 |
| R15 | do | 50 |
| R16 | do | 140 |
| R17 | do | 50 |
| R18 | do | 225 |
| R19 | do | 260 |
| R20 | do | 2850 |
| R21 | do | 1250 |
| R22 | do | 285 |
| R23 | megohms | 20 |
| R24 | do | 20 |
| R25 | do | 100 |
| R26 | do | 100 |
| R27 | ohms | 25000 |
| R28 | do | 15000 |
| R29 | do | 414 |
| R30 | do | 5000 |

Condensers:

| | | |
|---|---|---|
| 33 | mfd | 0.1 |
| 34 | mfd | 0.25 |
| 35 | mfd | .002 |

Normal power supply voltage—385 volts
Meter—1.0 milliampere for 7.0 pH units across the scale Formula 6 above may be used to calculate approximately the effectiveness of the voltage regulating action of tube 18' in Figure 2 by taking the term "$u$" in the equation as the product of the amplification factor of tube 18' with the voltage gain of tubes 16' and 17'. In this circuit the voltage gain of tube 16' is about 150, the voltage gain of tube 17' is about 15, and the amplification factor of tube 18' is 4. Hence, $u = (150)(15)(4) = 9000$.

The constant "$a$" applying to tube 15' may be estimated from the observed fact that a change of 1% in the voltage divider current produces the same effect at the plate of tube 15' as though the voltage divider current stayed constant and the grid potential of 15' changed 30 millivolts. Experiments indicate that this relation holds approximately for type 32E tubes under any conditions of operation so long as the voltage supplies to the various elements change their voltage in the same proportion. The voltage gain of tube 15' is about 50, so that a change of 30 millivolts on its grid would produce a change of about 1.5 volts at its plate. Since a 1% change in voltage divider current is equivalent to a fractional change $p_1$ of .01—

$$a(.01) = 1.5$$

and $$a = 150$$

The other terms appearing in Equation 6 are as follows:

| | |
|---|---|
| $E_s$ | 385 |
| $I$ | .035 |
| $r$ | 800 |
| $E_1$ | 200 |

Substituting in Equation 6 gives:

$$p_1 = \frac{p_s(385)}{(.035)(800) + (9000)(150) + (200)}$$

or $$p_1 = 0.0003 p_s$$

Thus, a fluctuation of 10% in the output voltage of power pack P will produce a fluctuation in the voltage divider current of only .003%. The effect of this small fluctuation on tube 15 may be estimated from the relation previously stated that a 1% current fluctuation would produce the same effect as 30 millivolts on the grid. For .003% current change, the equivalent grid change is $(.003)(30) = 0.1$ millivolt. Since this calculation estimates the effect of a 10% power supply voltage change as being equivalent to a 0.1 millivolt change on the grid of tube 15, the amplifier of Figure 2 meets the original design requirement of a 0.2 millivolt equivalent change with a good factor of safety. Measurements on completed amplifiers of this type confirm the calculated result as approximately correct. In this calculation, the neglect of the effect of the small voltage divider current change on the operation of tubes 16, 16', 17 and 17' is justified since the effects occurring in tubes 15 and 15' are amplified by the subsequent tubes and, therefore, are so large as to completely mask the effects occurring directly in the later stages. The fact that tubes 17, 17' and 18' have indirectly heated cathodes supplied from an unregulated power source may also be neglected since the effect of the heater power fluctuations is reduced by the very large overall gain of the preceding stages when the calculation is made of the equivalent effect at the grids of tubes 15 and 15'. Indeed, if less severe requirements were to be met by the amplifier, unregulated heating power could also be used for tubes 16 and 16'.

In the circuit of Figure 2 the transconductance between input terminals 11, 12 and output terminals 13, 14 may be estimated from the following data:

Voltage gain of tube 15 = 50 (approximately)
Voltage gain of tube 16 = 150 (approximately)
Transconductance of tube 17 in micromhos, allowing for losses in R17, R18 and tube 18 = 700 (approximately)

This gives—
Overall transconductance $= (50)(150)(.0007) = 5.2$ mhos

This figure, which again meets the original design requirements with a good factor of safety, is confirmed by direct measurement on a number of completed instruments.

The fact that the overall transconductance of this amplifier can be correctly computed in this simple manner from the separate gains of its component stages is the result of an important feature of my invention. The gains quoted for the individual tubes are based on the assumption that the stage in question is operating alone; that is, that its operation is unaffected by the operation of the other tubes. In practical multistage amplifiers operating from a single power supply source it frequently is very difficult to prevent the operation of the output stages from affecting the operation of the input stages. This is because the relatively large currents drawn from the power supply by the output stages produce a fluctuation in the power supply voltage that is impressed on the input stages through the common power supply connections. As a result of this interconnection, feedback effects occur that profoundly alter the overall performance of the amplifier. In some cases, the amplifier fails to develop the expected gain by a large factor; in others the amplifier fails to respond properly to input voltage and is quite useless for its intended purpose. The latter type of behavior may be illustrated in Figure 2 by assuming that tube 18' is omitted and terminal 31 of the power supply is directly connected to the voltage divider at the end of R21. In this case, there would be no regulating action on the current flowing in the voltage divider and the current flowing at any point in the circuit would depend only on the applied potential and resistance at the portion under consideration. Thus, if some effect should cause an increase in the cathode current of tube 17, the current increase would divide between resistors R19 and R20 and a portion would flow by way of R19, R18, etc., to R11. This increase in current in R11, R12, R13 and R14 would cause the plate voltage of tube 15 to decrease, in turn causing an increase in the plate potential of tube 16, and thereby causing a positive change in grid potential on tube 17. This positive change in grid potential would still further increase the cathode current of tube 17 and the process would continue until the grid of tube 17 started to draw current and brought the process to a halt. Under this condition, a small change in input voltage would make no change in the output current. If increasingly negative voltages were applied to the grid of tube 15, a point would be reached where the process just described would be reversed. The plate current of tube 17 would suddenly decrease to zero and further changes in input voltage would have no effect unless the grid of tube 15 were made sufficiently positive to permit the original process to repeat itself. The amplifier would thus behave as a "trigger circuit" and would be quite useless for D. C. voltage amplification.

It is clear that in the circuit of Figure 2, tube 15' causes tube 18' to control the power supply current so that the current in that portion of the voltage divider supplying tube 15' remains essentially constant. Thus, when the cathode current of tube 17 changes, tube 18' readjusts the power supply current to compensate for the effect of the cathode current change, thereby eliminating the resultant feedback effects.

Another desirable feature arising from my invention is that its application permits greater freedom in meeting design requirements. As explained in my copending application, Serial No. 244,210, the amplifier used in the "electronic potentiometer" circuit must be so arranged that one input and one output terminal are connected together. In Figure 2 it is apparent that no complications arise in connecting input terminal 12 to output terminal 14. Furthermore, the circuit modifications made to obtain the common input and output terminal connection in Figure 2 do not sacrifice any of the compensating benefits obtainable from the circuits. This has already been demonstrated to be the case as far as compensating the effects of power supply fluctuations is concerned. It may also be shown that this statement holds in the case of drifts arising from aging or temperature effects on the tubes and other components.

In Figure 2 it is clear from previous discussions that any effect of age or temperature on tube 15' will make only a relatively minute change in the plate voltage of tube 15', since the action of tubes 16', 17' and 18' will alter the current flowing in the voltage divider to counteract any plate voltage change. If it is assumed that age or temperature has produced a similar effect in the circuits of tube 15, this effect will also be counteracted by the change in voltage divider current and only a relatively minute change in the plate voltage of tube 15 will occur. Thus, the circuit arrangement of Figure 2 very closely compensates for effects of temperature or age so long as the effects are equal in the circuits of tubes 15 and 15'.

Condensers 33, 34 and 35 play an important part in the performance of the circuit of Figure 2. The function of condenser 33 is to attenuate high frequency components of the voltages being amplified as described in my copending application, Serial No. 244,210.

Condenser 34 plays an important part in the functioning of the regulator tubes 15', 16', 17' and 18'. It has already been explained how fluctuations in the voltage divider current cause the plate voltage of tube 15' to vary slightly and thereby produce a regulating action on the voltage divider current. Tube 16' also responds in the same manner to the fluctuating voltage divider current, but as far as low frequencies are concerned this response is completely masked by the relatively large amplified response originating in tube 15'. However, in the case of high frequencies the response of tube 15' may be greatly attenuated by the stray capacities in the plate circuit of 15', and, if this attenuation is sufficient, the response of tube 16' will no longer be masked by that originating in tube 15'. Thus, at high frequencies, the response of tube 16' to fluctuating voltage divider current will determine the controlling action of tube 18'. It is apparent from the circuit that unless the phase shift in the plate circuits of tubes 16' and 17' is quite large the response of tube 16' will be roughly 180° out of the proper phase relation to perform the controlling action. Instead of controlling the voltage divider current to reduce the high frequency fluctuation, tube 18' will act to accentuate these fluctuations, and, in fact, tend to cause oscillation at some high frequency. This unwanted behavior is prevented by condenser 34. This condenser attenuates the high frequency components of the voltages appearing in resistors R16, R17 and R18 across which the voltage supplying the screen of 16' is developed. Eliminating the high frequency components from the screen supply of tube 16' alters the response of tube 16' and prevents it from exerting the unwanted controlling action at high frequencies.

Condenser 35 also assists in reducing the high frequency response of tube 16'. Indeed, with a suitable value for condenser 35, condenser 34 is not required. However, the main reason for including condenser 35 in the circuit is to enable tube 18' to eliminate transients and high frequency ripple voltages originating in power supply P. Transients with a very steep wave front are often present in the A. C. power line and frequently these are able to pass through the filter circuits in A. C. operated power supplies. In such a case, the behavior of an A. C. operated D. C. amplifier would be seriously affected unless the transients were by-passed or regulated in some way. The regulating action of tube 15' usually is not rapid enough to remove these transients from the voltage divider current because design considerations commonly impose a relatively long time constant on its plate circuit. However, it is possible to design the plate circuit of tube 17' with a very short time constant, and, by feeding the transient voltage from the most positive point on the voltage divider through condenser 25 direct to the grid of tube 17', tube 18' may be made to respond with sufficient speed to iron out the transient. In effect, condenser 35 produces a sharp differentiation in the process by which tubes 15', 16', 17' and 18' regulate voltage fluctuations occurring at very high frequencies and at very low frequencies. At very low frequencies, the voltage gain of all four tubes is available to regulate the average output from the power supply to very close limits. At relatively high frequencies, tubes 15' and 16' play no part in the regulating action and tubes 17' and 18' respond with great speed to iron out fluctuations. With these combined actions, the current flowing in the voltage divider is made to be very pure D. C. even though the power supply is itself poorly filtered.

It is apparent from Equation 6 and the foregoing discussion that in applying the principles of this invention to reducing drift effects the amount of improvement obtained increases with the voltage amplification of tubes 15', 16', 17' and 18'. Where a high degree of stability is required, it may be obtained by using a number of voltage amplifier stages following tube 15'. Usually, however, the same result may be economically obtained by employing regeneration with a fewer number of tubes. For example, increased freedom from drift effects may be obtained in Figure 2 by coupling the plate of tube 17' to the grid of tube 16' through a resistor of such a magnitude that the effective overall gain of tubes 16' and 17' is essentially infinite.

Since the function of tube 18' is that of regulating the current from the power supply, any other means or circuit arrangement performing a current or voltage controlling action may be substituted for it. Thus, the circuit of Figure 2 may be altered so that tube 18' in effect shunts the power supply and an increase in the voltage divider current causes tube 18' to draw more current from the power supply and thereby reduce its voltage. As another alternative, tube 18' may be dispensed with entirely and the current control carried out by means of grid controlled rectifiers in the power supply or by a saturated core reactor in the A. C. mains.

It will be further understood from the principles set forth above that it is not essential that all elements of the circuit be supplied from the same power source. Thus, in Figure 2, most of the benefits of my invention would be retained if the cathodes of tubes 15 and 15' were heated from some other source than the current flowing in the voltage divider. So long as the cathodes of tubes 15 and 15' were supplied from the same source and reacted similarly to variations in the magnitude of this source, tube 15' would cause tube 18' to regulate the voltage divider current so as to compensate the effect of heater voltage fluctuations on tube 15. The arrangement of Figure 2, in which a single source of power is used for all of the elements in tubes 15 and 15', is to be preferred, however, as it does not involve the assumption that both tubes will behave alike when the voltage on one of the elements is changed.

The principles of this invention are not limited in their application to D. C. amplifiers of the type described. There are other types of circuits employing vacuum tubes that perform a D. C. amplifying action, and in most cases the same problems arise in preventing drift of the amplifier output. For example, a type of D. C. amplifier occasionally used does not amplify the D. C. signal directly, but first converts it to A. C. through the action of a modulator, amplifies the A. C., and then reconverts to D. C. through a demodulator-filter system. In such a case, the A. C. output of the modulator stage depends on the D. C. voltage supply to the modulator as well as the signal, and the same problems in drift arise as in amplifiers of the type already discussed. These drift problems may be handled in the same way—the signal amplifier may be paralleled by a similar amplifier whose sole purpose is to control the D. C. voltage supplied to one or more elements in the tubes of both modulators.

While the particular form of apparatus for amplifying D. C. voltages and currents herein described is well adapted to carry out the objects of the present invention, it is to be understood that various modifications and changes may be made without departing from the principles of the invention. The invention includes all such modifications and changes as come within the scope of the appended claims.

I claim:

1. A D. C. amplifier apparatus comprising an amplifying portion operative for producing amplification of the D. C. signal to be amplified and including an amplifying tube, a second tube, a common source of potential for the corresponding elements of said tubes, said corresponding elements of said tubes being connected to said common source of potential in such manner as to undergo corresponding variations of potential with variation in the potential of said common source, and means controlled by the output of said second tube for controlling the potential variations of said common source.

2. A D. C. amplifying apparatus comprising a pair of amplifying tubes having substantially similar tube characteristics, means associated with one of said tubes whereby the same is adapted to amplify the D. C. signal, a common source of potential for the corresponding elements of said tubes, said corresponding elements of said tubes being connected to said common source in such manner as to undergo corresponding variations in potential with variations in potential of said common source, and means controlled by the output of said other tube for controlling the potential variations of said common source.

3. A D. C. amplifier apparatus comprising an amplifying tube having means associated therewith whereby the same is adapted to amplify the D. C. signal, a second tube, a resistance, means for passing current through said resistance whereby the resistance forms a source of potential, the corresponding elements of said two tubes being connected to said resistance so that the corresponding elements of said tubes undergo corresponding variations of potential, and means controlled by the output of said second tube for controlling the current variations in said resistance.

4. A D. C. amplifier apparatus comprising an amplifying circuit including an amplifying tube operative to amplify the D. C. signal, a second tube, current supply means, means energized by said current supply means to form a source of potential, the corresponding elements of said tubes being connected to said source of potential so as to be subjected to similar potential variations, and means controlled by the output of said second mentioned tube for controlling the potential variations in said source of potential.

5. A D. C. amplifier apparatus comprising an amplifier tube with means associated therewith whereby the same is operative to amplify the D. C. signal, a second tube having tube characteristics substantially similar to said first-mentioned tube, a common source of potential for the corresponding elements of said tubes and connections to said elements so that the corresponding elements of said tubes undergo corresponding variations in potential with variation in potential of said common source, the output of said second tube being opposite to the output of said first tube so that the effects of potential variations on the elements of said first tube are in part at least compensated by said second tube, and means for controlling the potential variations of said source of potential.

6. A D. C. amplifying apparatus comprising an amplifying tube and input and output terminal connections for the signal to be amplified, a second tube, a source of current, means energized by said source of current for forming a source of potential for said tubes, the corresponding elements of said tubes being connected to said source of potential so as to be subjected to corresponding variations, and a regulating tube controlled by the output of said second tube for controlling the potential variations in said common source.

7. A D. C. amplifier apparatus including a pair of tubes having substantially similar tube characteristics, one of said tubes being arranged to act as the amplifier of the signal, a source of current, a resistance energized by said source of current forming a common source of potential for the corresponding elements of said tubes, said corresponding elements being so connected to said resistance as to undergo corresponding potential variations upon variations in potential of said common source, a potential regulating tube, and means connecting said potential regulating tube with the output of said second tube for controlling the potential variations of said common source of potential.

8. A D. C. amplifier apparatus comprising a pair of amplifying tubes having substantially similar tube characteristics, one of said amplifying tubes being arranged for amplification of the D. C. signal, the corresponding elements of both tubes being connected to a common voltage divider so as to undergo similar variations in potential, a source of current supply for said voltage divider including a regulator tube, and means connecting the grid of said regulating tube with the output of said second tube whereby said regulating tube controls the potential variations in said voltage divider.

9. A D. C. amplifier apparatus including a plurality of tubes connected to act as a cascade D. C. amplifier, a second set of tubes arranged in cascade, a common source of potential and connections thereto with the corresponding elements of said two sets of tubes whereby the same undergo similar variations in potential with variation in the potential of said common source, and means connected with the output of said second set of tubes for controlling the potential variations in said common source of potential.

10. A D. C. amplifier apparatus including a plurality of tubes connected to act as a cascade amplifier, a second set of corresponding tubes arranged in cascade, a common source of potential for both sets of tubes, and connections from said common source of potential to corresponding elements of said two sets of tubes whereby the same undergo substantially like variations in potential with variation in potential of said common source, a source of current for maintaining the potentials of said common source, and means for regulating the flow of current from said common source in response to the output of said second set of tubes for controlling potential variations of said common source.

11. A D. C. amplifying apparatus including a voltage divider, a current source for said voltage divider, a regulating tube in the connections between said voltage source and said voltage divider, a plurality of amplifier tubes having their elements connected to said voltage divider and arranged for cascade amplification, a second set of similar tubes having their elements correspondingly connected to said voltage divider so as to undergo corresponding variations in potential with variation in the potential across said voltage divider, the output of said second set of tubes being arranged to bias the regulating tube for controlling variations in the potentials of said voltage divider.

12. In a D. C. amplifier apparatus, a common source of potential, a plurality of tubes having their elements connected to said common source of potential and arranged to act as a cascade amplifier, a second set of corresponding tubes having their elements correspondingly connected to said source of potential whereby the elements of said two sets of tubes undergo substantially like variations upon variation in the potential of said common source, means for regulating said source of potential for controlling potential variations therein controlled by the output of said second set of tubes, and means for attenuating high frequency components.

13. In a D. C. amplifier apparatus, a common source of potential, a plurality of tubes having their elements connected to said common source of potential and arranged to act as a cascade amplifier, a second set of corresponding tubes having their elements correspondingly connected to said source of potential whereby the elements of said two sets of tubes undergo substantially like variations upon variation in the potential of said common source, means for regulating said source of potential for controlling potential variations therein controlled by the output of said second set of tubes, and condensers arranged across a part of said source of potential for attenuating high frequency components.

14. In a D. C. amplifier apparatus, a common source of potential, a plurality of tubes having their elements connected to said common source of potential and arranged to act as a cascade amplifier, a second set of corresponding tubes having their elements correspondingly connected to said source of potential whereby the elements of said two sets of tubes undergo substantially like variations upon variation in the potential of said common source, means for regulating said source of potential for controlling potential variations therein controlled by the output of said second set of tubes, and a condenser connected to the last tube of said second set for eliminating high frequency ripple voltages originating from said source of current.

15. A D. C. amplifier apparatus, including a pair of vacuum tubes of substantially identical tube characteristics arranged in a bridge circuit, which bridge circuit is so arranged that the input signal to be amplified is applied to one only of such tubes and the outputs of said tubes are opposed and the amplifier output obtained across the opposed outputs of said tubes, said tubes having their corresponding elements connected to a common source of potential in such manner as to undergo substantially like variations in potential upon variation in the potential of said common source, and means controlled by the tube to which the input signal is not applied for controlling potential variations of said common source.

16. A D. C. amplifying apparatus, including a plurality of stages arranged in cascade, each of said stages including a pair of tubes, the tubes of each stage having substantially identical tube characteristics, one tube of each stage being arranged for amplification of the D. C. signal to be amplified, said tubes being connected to a common source of potential in such manner that the corresponding elements of the tubes of each stage undergo substantially like variations in potential with variation in the potential of said common source, and means controlled by the set of tubes which do not amplify the D. C. signal for controlling potential variations of said common source.

HENRY H. CARY.